A. G. DONNELLY.
AUTOMATIC FILM EXPOSURE APPARATUS.
APPLICATION FILED FEB. 7, 1914.
1,098,371.
Patented June 2, 1914.
7 SHEETS—SHEET 6.
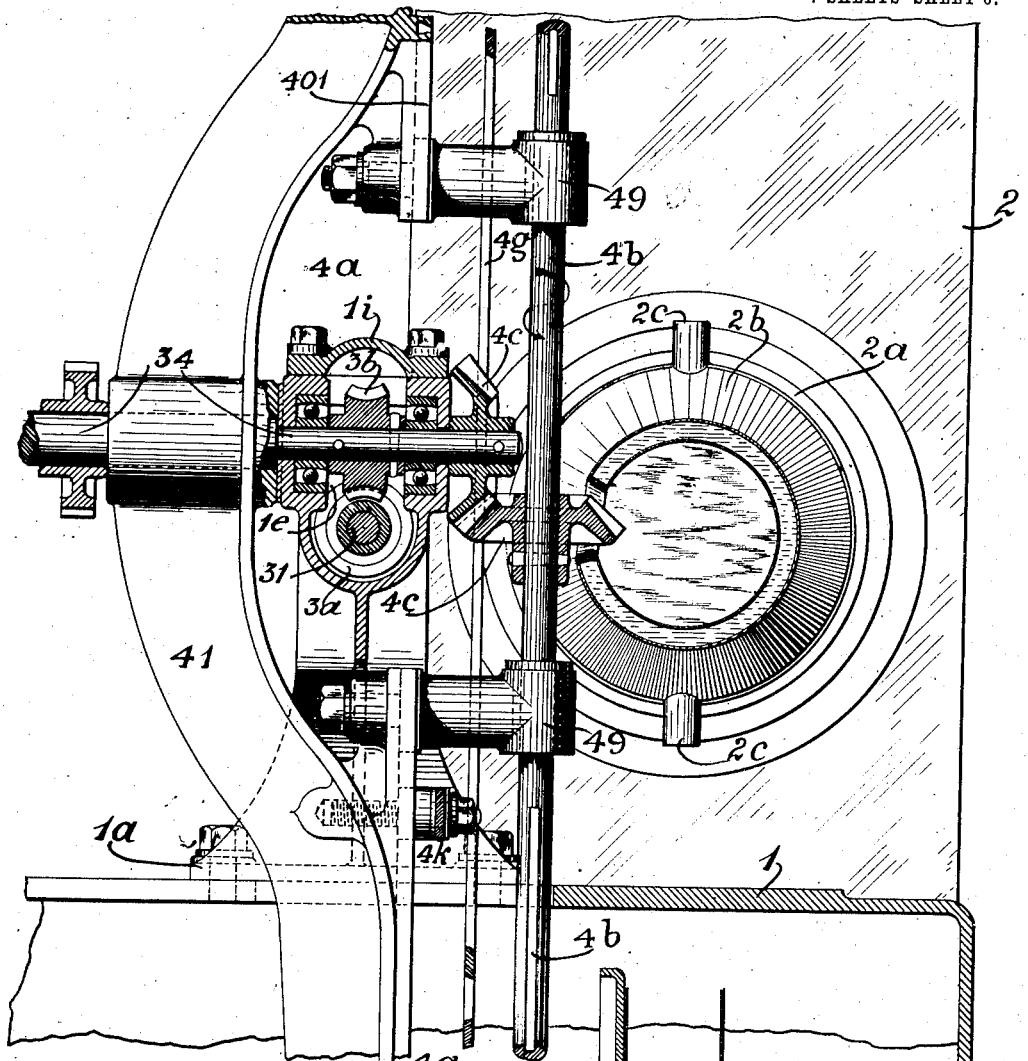
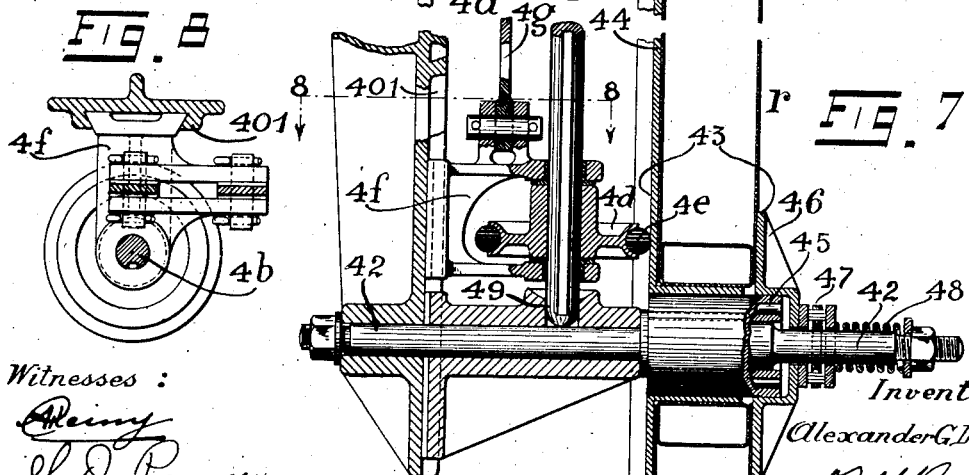
Witnesses:
Inventor:
Alexander G. Donnelly
By his Att'y

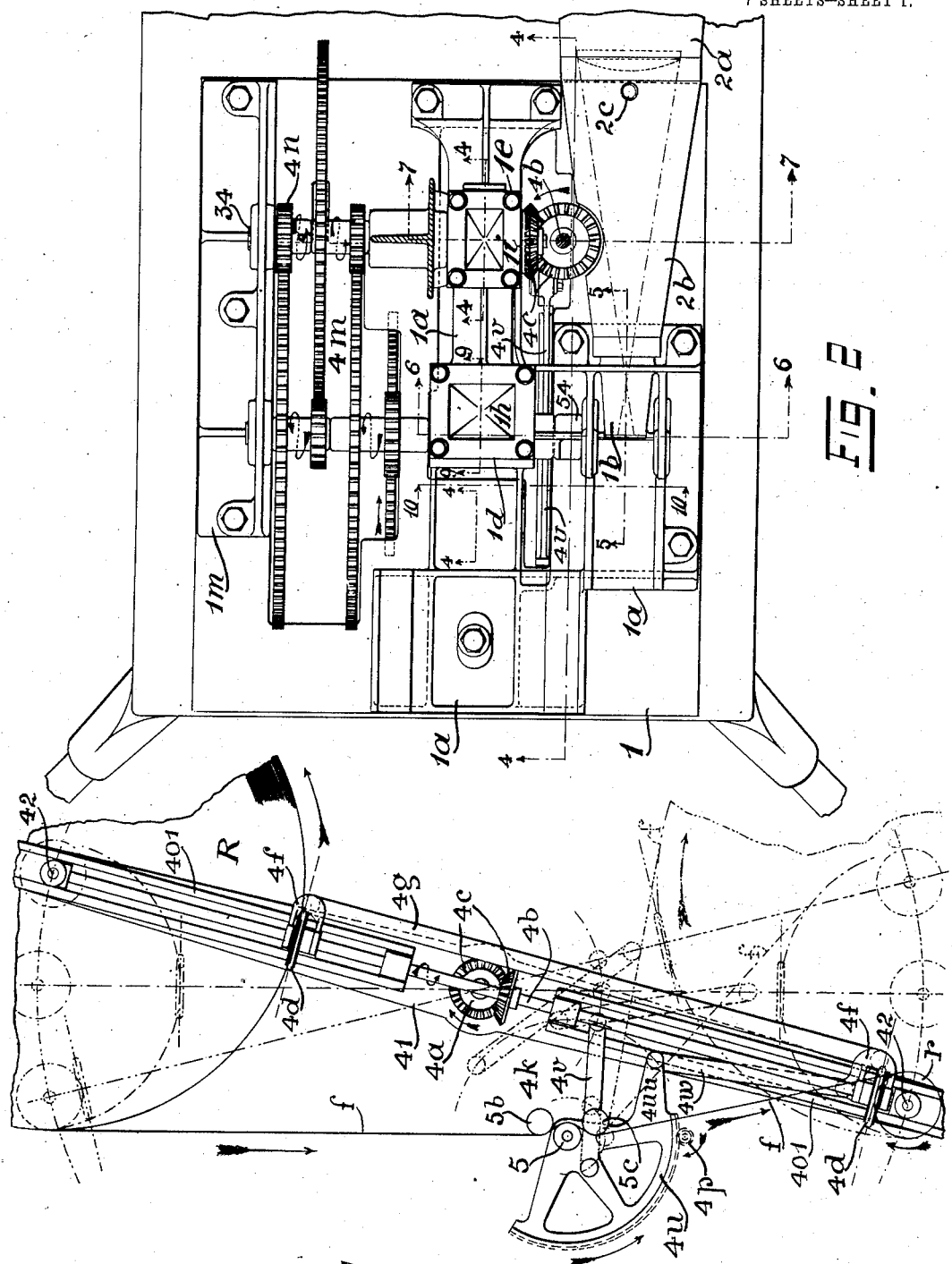

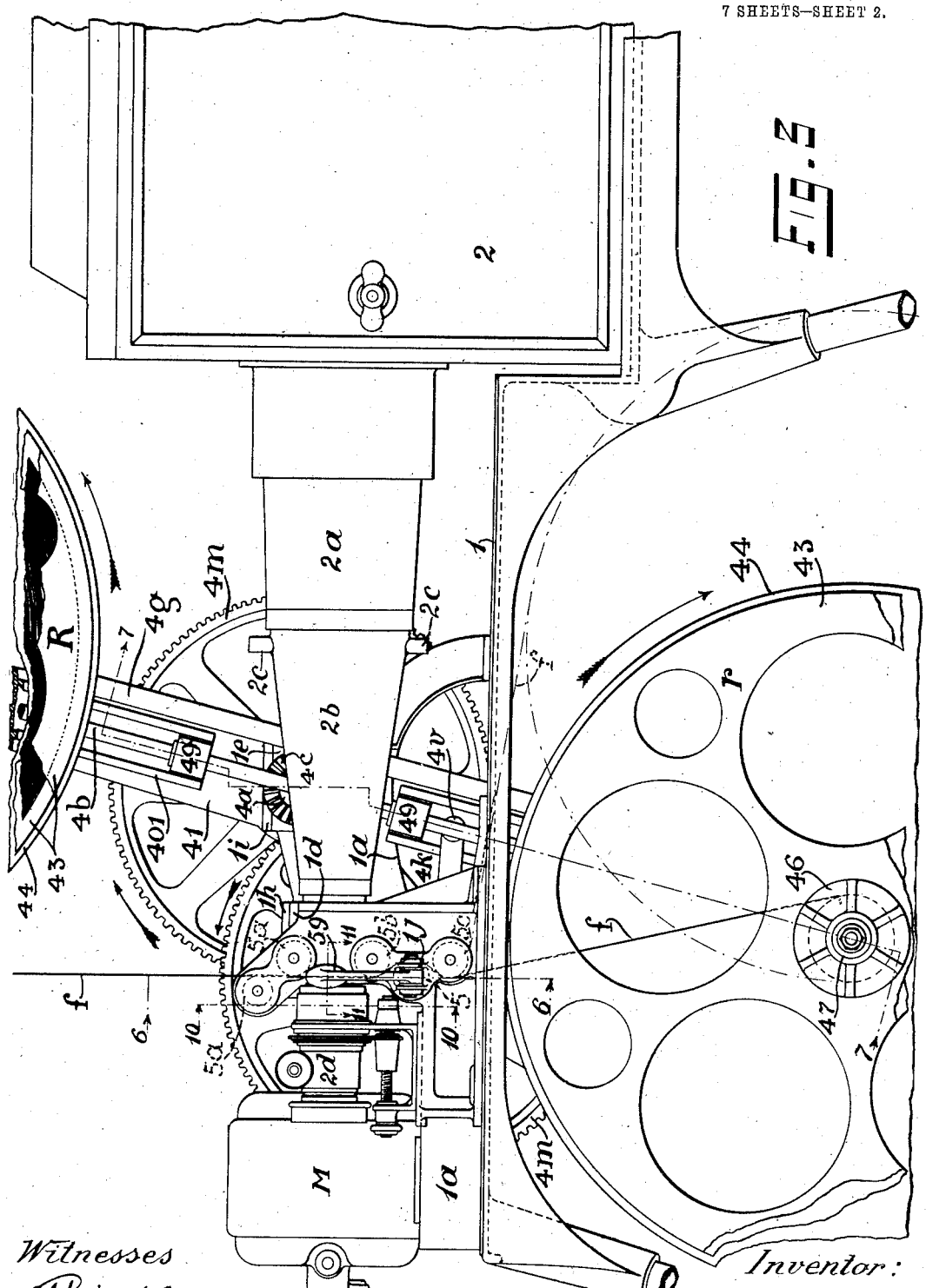

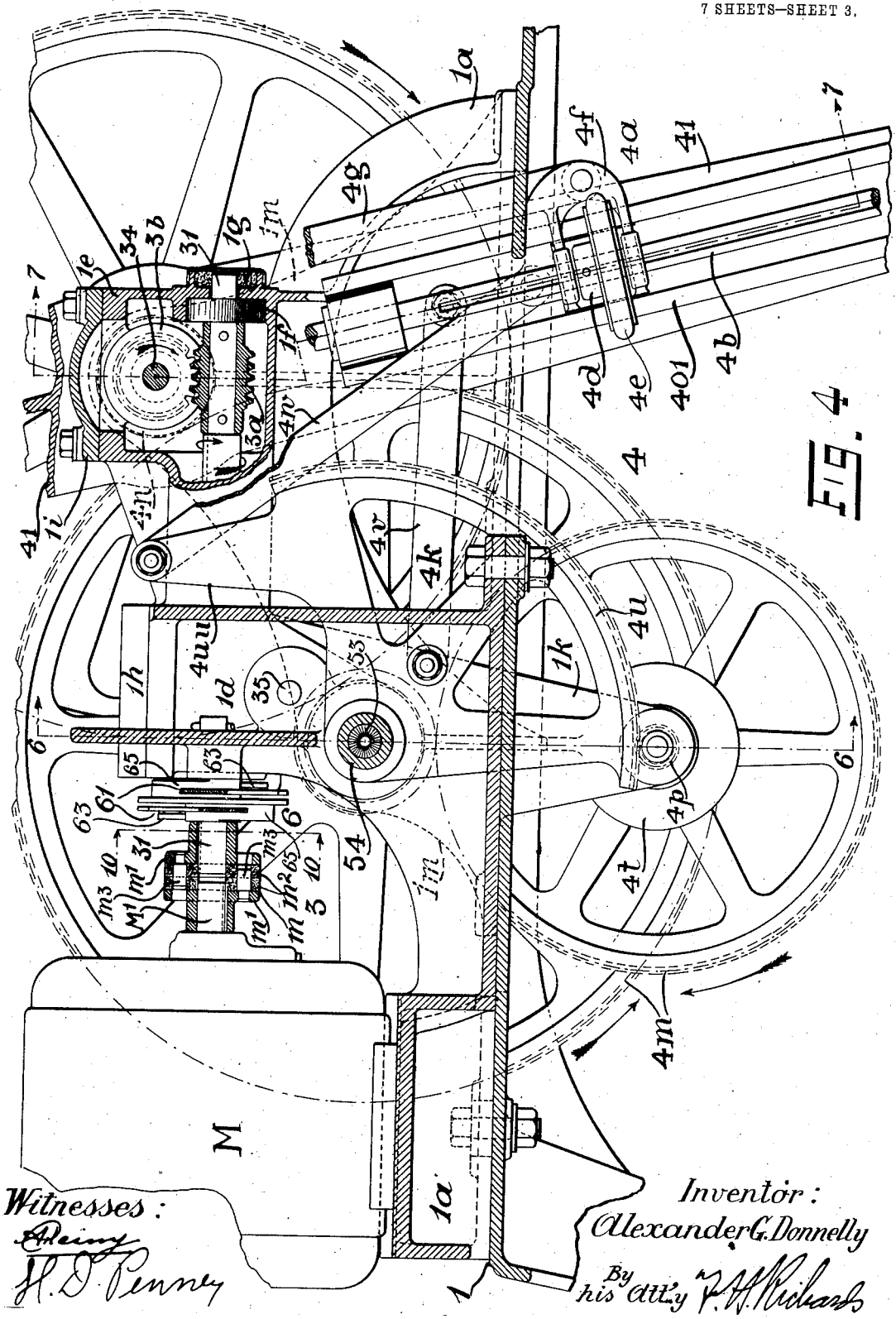

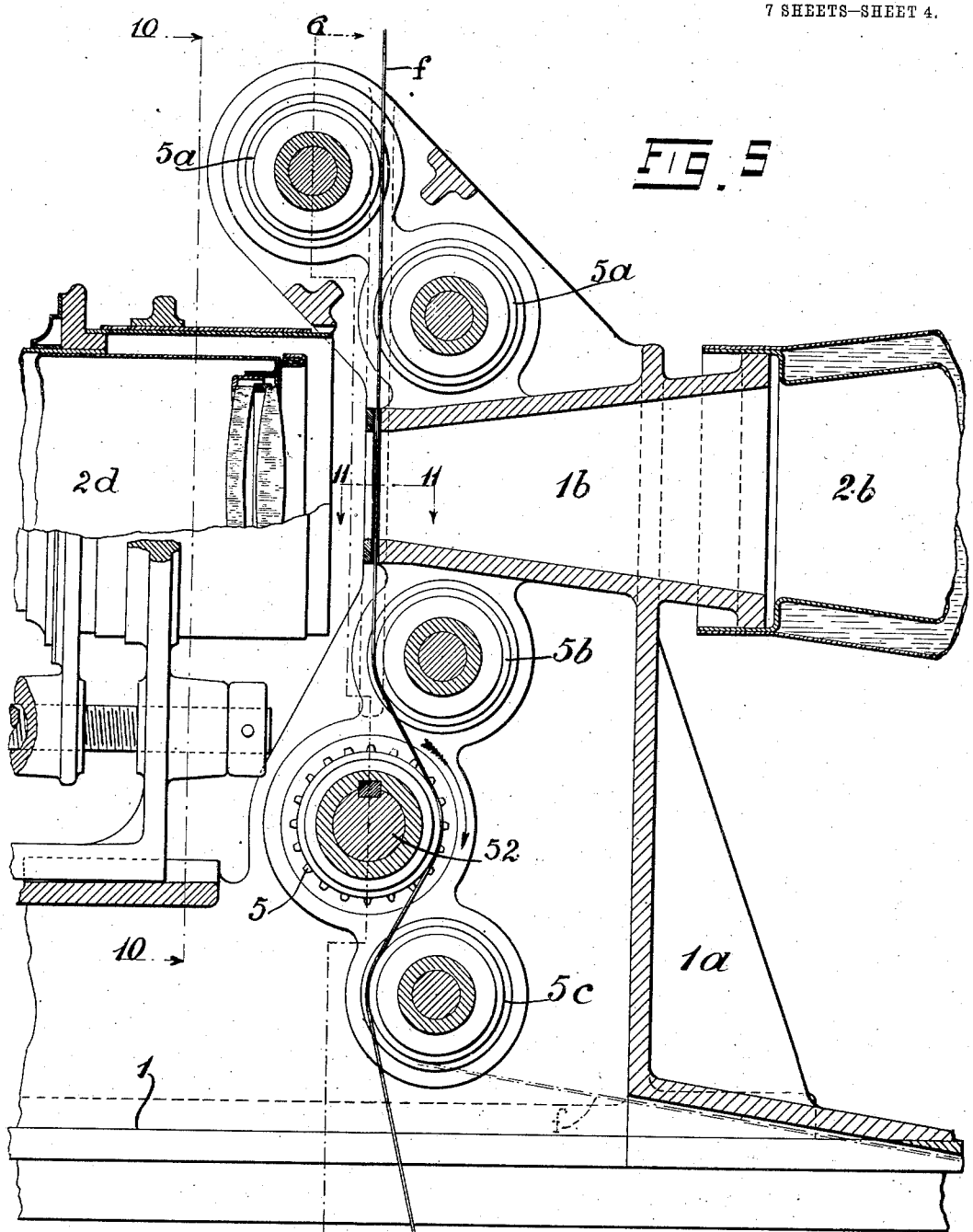

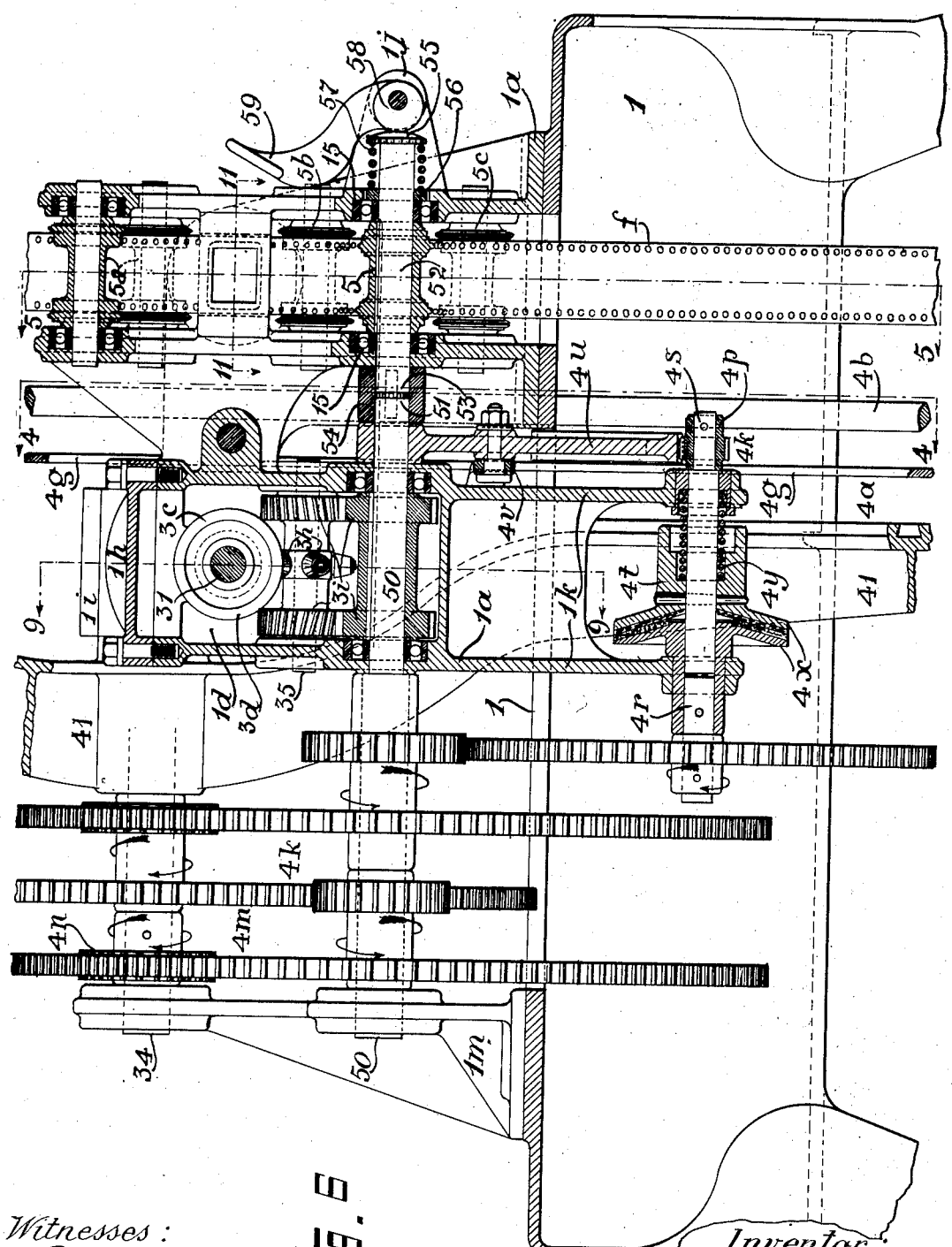

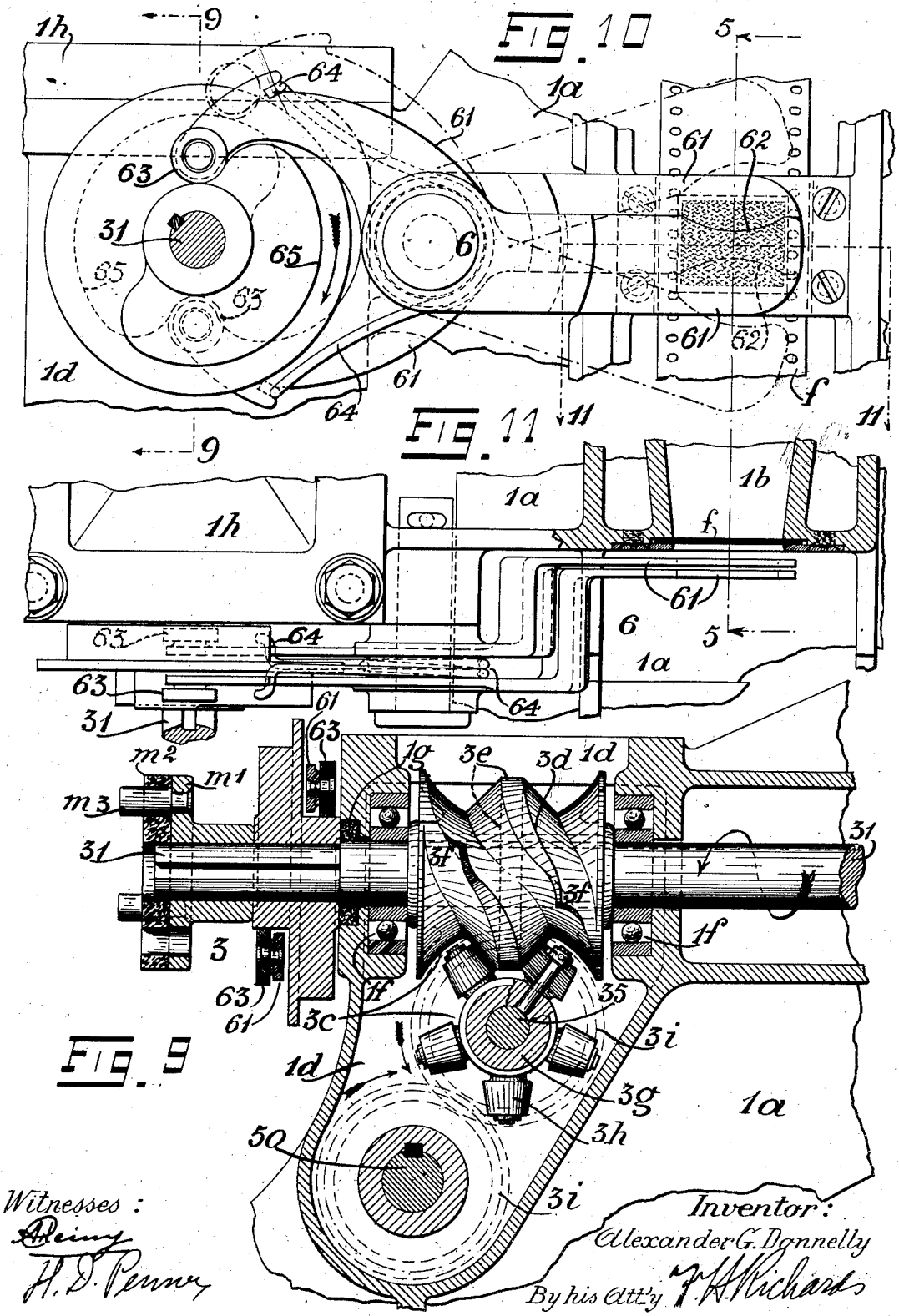

UNITED STATES PATENT OFFICE.

ALEXANDER G. DONNELLY, OF NEW YORK, N. Y., ASSIGNOR TO QUASAPIC COMPANY, OF NEW YORK, N. Y., A CORPORATION OF NEW YORK.

AUTOMATIC FILM-EXPOSURE APPARATUS.

1,098,371.  Specification of Letters Patent.  Patented June 2, 1914.

Application filed February 7, 1914. Serial No. 817,113.

*To all whom it may concern:*

Be it known that I, ALEXANDER G. DONNELLY, a citizen of the United States, residing in New York city, in the county of New York and State of New York, have invented certain new and useful Improvements in Automatic Film-Exposure Apparatus, of which the following is a specification.

The objects of my invention are to enable me to use films much longer and containing several times as many pictures as are now practicable, to increase the number of exposures per unit of time and the linear speed of the films, and their safety and durability.

In the drawings, Figure 1 is a diagrammatic view illustrating the movements of the film and reel-carrier; Fig. 2 is a general plan with the reel-carrier removed, and Fig. 3 a side elevation. The remaining figures, except Fig. 10, are sections, Figs. 4, 5 and 9 axial or parallel with Fig. 3 and the others transverse. Figs. 5, 9, 10 and 11 are full size. Fig. 4 is on the planes 4—4 of Figs. 2 and 6, and partly in elevation. Fig. 5 is full size, through the optical tube, on plane 5—5 of Figs. 2, 6, 10 and 11. Fig. 6 is at the feed plane, on the plane 6—6 of Figs. 2 to 5. Fig. 7 is at the plane 7—7 of Figs. 2, 3 and 4, and illustrates the reel-carrier and reel-feed. Fig. 8 is at the horizontal plane 8—8 of Fig. 7. Fig. 9 illustrates the film-feed, the plane 9—9 of Figs. 2 and 6 and 10, Fig. 10 is a transverse elevation of the exposure orifice and shutters, at the plane 10—10 of Figs. 2 to 5, and Fig. 11 is a horizontal sectional plan on the plane 11—11 of Figs. 3, 5 and 10.

In general terms my invention constitutes a film exposure apparatus characterized by positive, differential reel-feed motions adapted to unwind the film from the supply and rewind it upon the receiver reel at constant linear speed properly timed to the exposures and the exposure sprocket, so that the pull on the film is reduced to a negligible minimum by substantially right-line film-approach to the exposure orifice, said approach line being practically unvarying on location and tangent to the wound film upon the supply reel; by accomplishing the above results with continuously-engaged toothed gearings; and by the interpolation, in the gear trains, of releasing engagements or clutches, which permit reels to be mounted and dismounted and films to be properly positioned, adjusted, and given the proper tension with very great facility in the minimum time.

I provide a table-like stand whose cast iron finished top forms the bed plate 1 of the apparatus and may have an offset end to support the lamp box 2. The optical tube consists in three parts, viz;—the condenser tube $2^a$ attached to the box 2, the terminal $1^b$ formed in a main frame $1^a$ mounted on the bed plate 1; and water-jacketed intermediate tube $2^b$, provided with nozzles, $2^c$, to which water supply and eduction tubes can be attached, for water circulation, to cool the tube and preserve the films from injury by heat.

Mounted on the main frame $1^a$, coaxial with the optical tube $2^a$—$2^b$—$1^b$, is a projector $2^d$, of known type, with the usual adjustments. On the main frame 1 and on an axis parallel with and, as the drawings read, to the rear of the optical axis, I mount an electric motor M provided with the usual accessories and adapted to be put in a power circuit; and a primary transmission shaft 31, which is flexibly coupled to the motor shaft M' by a coupling $m$ which compensates misalinement and insures smooth running and which comprises metal disks $m^1$ fixed to each of said shafts; a leather disk $m^2$ fastened to each of said metal disks; and a set of pins $m^3$ fast in each of said metal disks and extending into sockets formed in the leather disk, $m^2$, fast to the opposite metal disk.

The reel mechanism 4 has the axes of its motions transverse to the optical axis, and comprises a rocking reel-carrier 41 which is a beam at whose ends the supply reel R and receiver reel $r$ are revolubly mounted; a differential reel feed $4^a$ adapted to simultaneously rotate the reels at such angular speeds, substantially inversely proportional to the radii of the film-spirals in the act of being unwound from and wound upon them that the unwinding and winding will be nearly linearly equal and cause no strain in the film, or merely enough to lay the film smoothly; and a compensating shifting mechanism $4^k$ adapted to rock the reel carrier 41 in such manner as to maintain substantial tangency between the outer film-spiral on the supply reel and the film-feed plane extending across the mouth of the optical tube 1$^d$; and to shift the friction rollers of the reel feed in such manner as to cause them to unwind and wind the film at substantially the same linear speed.

Above the optical tube, to opposite sides of the feed plane, I revolubly mount a pair of guide rollers 5$^a$ to make sure that the film $f$ approaches the optical axis in a right line; and below said tube I mount a comparatively widely spaced pair of guide rollers 5$^b$, 5$^c$ tangent to the feed plane, and intermediately between them, but to the opposite side of the film, the film-positioning intermittently rotated sprocket 5, whose teeth engage marginal holes in the film and accurately position it during exposures, in the usual manner.

The film, cast from the supply reel R into the feed plane as aforesaid, descends between the upper guide rollers 5$^a$, through the slot at, and across the mouth of the optical tube, bends around the near guide roller 5$^b$, the sprocket 5 and the lower roller 5$^c$ and thence passes to and is wound smoothly upon the receiving reel $r$. A transmission 3, connects the moving members with the motor M and times their motions.

*Transmission and sprocket drive.*—The primary transmission shaft 31 extends co-axial with the motor shaft M', from the coupling $m$, through two grease boxes, 1$^d$ and 1$^e$, and ball bearings 1$^f$ in their cheeks; and suitable elastic washers 1$^g$, or glands, which retain the grease. The boxes are respectively closed by suitable caps, 1$^h$ and 1$^i$. To drive the reel feed 4$^a$ and rocking mechanism 4$^k$, I provide, in the box 1$^e$, a transverse shaft 34 and a worm gearing comprising a worm 3$^a$ and worm wheel 3$^b$ respectively fixed to the shafts 31 and 34. To drive the sprocket 5, I provide a gearing comprising a transverse shaft 35 and, in the box 1$^d$, an intermittently acting gearing 3$^c$ adapted to alternately rotate the shaft 35 and sprocket 5 through a determined fraction of a turn, to feed the film to an exposure and during the remainder, which constitutes the exposure-period, to arrest and hold them absolutely stationary, said gearing 3$^c$ comprising, fixed to the primary shaft 31, a cam or, more properly, a "drunken" or variable-pitch worm 3$^d$ whose thread has a medial circumferential or no-pitch sector 3$^e$ measuring substantially three-fifths of a circle and, merging easily thereinto, quick-pitch terminals, 3$^f$; fixed to the shaft 35, a worm wheel, 3$^g$, whose teeth are preferably conical rollers, 3$^h$; and a sprocket shaft 50, which mounts the sprocket 5 and is connected with the worm-wheel shaft 35 by like preferably twin spiral gears 3$^i$. The latter shaft is introduced to facilitate construction; and the sprocket might be mounted on the shaft 35. During the engagement with the no-pitch sector 3$^e$ of the thread, the primary shaft 31 revolves idly and the driven members and film are held stationary; but when the quick-pitch engagement succeeds there, said members are rotated through the feed sector of motion and film-feed occurs. The graduation of the screw thread is such that the driven members are accelerated and retarded without shock. Obviously, one turn of the primary shaft rotates said driven members one tooth-angle and, as illustrated, five turns of the primary make one turn of the driven members. To enable me to adjust the film pictures positively to the exposure axis, I introduce, between the sprocket 5 and the gearing 3, a manually-operable release engagement clutch 51, which might be a frictional or positive clutch of a known type, but which I prefer to make as illustrated, in order to assure positive action and smooth running. I therefore provide an extension 52 of the shaft 50, revoluble co-axial therewith in ball bearings 15 in the frame 1$^a$ and to said extension I spline the sprocket 5, which is axially located by the ball bearings. On the adjacent ends of the shafts 50 and 52, I form clutch members, 53, preferably complementary radial teeth; and encircle said shaft ends with a collar, 54. On the outer end of the extension shaft 52 I form a spheroidal head 55 with a knurled edge by which the said shaft and the sprocket 5 can be turned; between said head and a collar 56, thrust against or part of the small race of the adjacent ball-bearing 15, I strain a releasing spring 57 and transversely in line with the shaft, on main-frame brackets 1$^j$, I pivot a spherical faced cam 58, which when its handle, 59, is upturned, as illustrated, thrusts in the shaft 52, compresses the spring 57 and engages the teeth 53 and the two shafts 50, 52. When the handle 59 is swung out, the spring 57 draws out the shaft 52 and releases it, the sprocket 5 and the film from the transmission 3 and motor M, for manual adjustment.

*Reel mechanism, 4.*—The reel carrier 41 is pivoted on the shaft 34 whose rear end has a bearing in a pillow frame 1$^m$, which is fast to the bed plate 1. To suitably mount the reels R and $r$, I provide, at the ends of the carrier 41, pintles 42 and frictional reel-clamps 43, each comprising a driving disk 44 formed with a peripheral, back-turned flange and a central tubular stump on which the reel is shipped and which contains a roller bearing 45 by which it is slidably mounted on a pintle 42; a discoidal face clamp 46; and means for clamping the reel between the discoidal members 44 and 46, illustrated as comprising a nut engaging the threaded end of the pintle, a thrust bearing, 47, of known type, and between them, a clamp-spring 48, which clamps the reel in the clamp 43 and presses latter's friction disk 44 against the friction wheel $4^d$.

The shifting mechanism $4^k$ comprises a reducing train $4^m$ which may be of any known type and is illustrated as a spur wheel train beginning with a pinion $4^n$ on the shaft 34, connecting it with and terminating in a pinion $4^p$ on a cut shaft whose sections $4^r$, $4^s$ are connected by a clutch $4^t$, and which are mounted on bearings provided in extensions $1^k$ of the main frame; a wheel segment, $4^u$ pivotally mounted on the main frame, for convenience, on the shaft 50; a link $4^v$ connecting the segment with the carrier 41, and a link $4^w$ connecting an arm $4^{uu}$ of the segment with the reel-feed $4^a$.

The clutch $4^t$ comprises suitably lined frictional members $4^x$, respectively fast to the shaft sections $4^r$, $4^s$ and a spring $4^y$ which normally engages them. The clutch enables the reel carrier 41 and reel $4^a$ feed to be adjusted and moved from one limit to the other of their motions without operating the gear train $4^m$. When reels are changed, or at any other time, the clutch $4^t$ may be disengaged by separating its friction members, the pinion $4^p$ revolved, the segment $4^u$ and reel carrier 41 rocked and the friction rolls $4^d$ of the reel feed correspondingly shifted.

The reel feed $4^a$, best shown in Figs. 4, 7 and 8, comprises a shaft $4^b$ revoluble but axially fixed in bearings 49 on the carrier 41, and geared to the shaft 34 by bevel gears $4^c$, co-acting with the friction disk 44 of each reel-clamp 43, a friction wheel $4^d$ splined to the shaft $4^b$, having a rubber tire $4^e$, in contact with the friction disk 44, and axially located by the engagement of its hub with the cheeks of a slide $4^f$, slidable on guides 401, lengthwise of the carrier 41, the two slides being connected with one another by a coupling $4^g$ and with the shift mechanism, $4^a$, specifically with its segment $4^u$, by the link $4^w$.

I provide an improved shears-type shutter 6, comprising a pair of shear blades 61 medially pivoted on the main frame between the primary shaft, 31, and the exposure opening, terminating adjacent to the latter in flat blades formed with concave exposure edges 62 and at their opposite ends in cam-rollers 63; a spring 64 which tends to close the shutter; and a pair of oppositely-acting cams 65, fixed to the primary shaft 31, whose rotation alternately opens the shutter and permits it to be closed by the spring 64. The concave exposure edges 62 of the shutter blades initiate and terminate exposures on the optical axis, dilate or contract it symmetrically and prevent wedge-shaped exposures, which would not be pleasing.

The operation of my exposure apparatus is as follows: The supply reel R is mounted in the upper and the receiver reel $r$ in the lower reel-clamp 43, the film $f$ passed from the former across the exposure opening of the optical tube, around the guide rollers and sprocket 5, and suitably connected with the receiver reel; the film picture is adjusted to the optical axis by disengaging the sprocket-clutch 51 and suitably rotating the sprocket 5; and the tension on the film, the location of the carrier 41 and reels, and the friction wheels $4^d$ of the reel feed, are adjusted by disengaging the shift clutch $4^t$ and rotating the segment $4^u$ and pinion $4^p$. Exposure is begun by starting the motor M, each of whose revolutions is a cycle and causes the shutter 6 to close and open; the sprocket 5 to make one-fifth of a revolution (which occupies substantially two-fifths of the cycle) and thereby change the film-picture; the reel feed shaft $4^b$ and friction wheels $4^d$ to turn through a determined angle and rotate the reel-clamps 43 and reels through determined distances; and the shift segment $4^u$ to rock through a small angle, rock the carrier 41 and slide the friction wheels $4^d$.

The scope and differential nature of crank-and-link motion enable me so to locate the crank pins which connect the segment $4^u$ with the links $4^v$ and $4^w$ and the carrier 41 and friction wheels $4^d$ that the consequent rocking of the carrier will maintain substantial tangency between the film-feed plane and the outer spiral on the supply reel R; and the translation of the friction wheels $4^d$, from and toward the axes of the reels (or vice-versa) will cause substantially (but not exactly) equal, linear speeds of film-unwinding and winding. In actual practice it is not necessary, or desirable, that the two should be exactly linearly equal. What is desirable is, to keep the film taut between the sprocket 5 and the receiver reel $r$ in order that the film may be wound smoothly; to avoid the formation of the troublesome and dangerous "loop" which all known exposure machines cause between the supply reel and the exposure axis; and at the same time to slack the film on the supply reel so that it will unwind therefrom without being strained. My apparatus, and more especially the combination of the shift mechanism $4^k$ and reel feed $4^a$ accomplishes this result with as near an approach to perfection as practice necessitates. The traverse of the friction rollers from the initial to the final position (shown respectively in full and dotted lines, Fig. 1) coincides substantially with the winding of the film upon the receiver reel $r$ and slightly leads its unwinding from the supply reel R, so that the film is kept taut between the sprocket 5 and the receiver reel, but is loosened in, prior to being cast from the supply reel. Those accustomed to the design of crank-and-link apparatus will know that the desired results can be approximated with any required nicety. Should it be desired to suspend an unfinished film exposure and rewind the film upon the supply reel, the motor M and the apparatus can be reversed.

Having thus described my invention, I claim:

1. A film-exposure apparatus comprising a frame and operably mounted thereon transmission mechanism operable by power and, operably connected with said transmission, a movable carrier adapted to operably mount a supply film-reel, means to operably mount a receiver film-reel, shift mechanism adapted to shift said carrier, reel-feed mechanism adapted to rotate film-reels mounted as aforesaid, and a sprocket wheel and sprocket mechanism adapted to alternately advance and position films for exposures.

2. A film-exposure apparatus comprising a frame and operably mounted thereon transmission mechanism operable by power and, operably connected with said transmission, a movable carrier adapted to operably mount a supply film-reel, means to operably mount a receiver film-reel, compensating shift mechanism adapted to shift said carrier and maintain substantial tangency between the outer film-spiral of the supply reel thereon and the film-approach plane of the apparatus, differential reel-feed mechanism adapted to rotate film-reels mounted as aforesaid and a sprocket wheel and sprocket mechanism adapted to alternately advance and position films for exposures.

3. A film-exposure-apparatus comprising a frame and mounted thereon transmission mechanism operable by power and, operably connected with said transmission mechanism, a movable carrier adapted to operably mount supply and receiver film-reels, shift-mechanism adapted to shift said reel-carrier, reel-feed mechanism adapted to rotate film-reels mounted on said carrier, and a sprocket wheel and sprocket mechanism adapted to alternately advance and position films for exposures.

4. A film-exposure apparatus comprising a frame and mounted thereon transmission mechanism operable by power and, operably connected with said transmission mechanism, a movable carrier adapted to operably mount supply and receiver film-reels, compensating shift mechanism adapted to shift said reel carrier and maintain substantial tangency between the outer film spiral of the supply reel thereon and the film-approach plane of the apparatus, differential reel-feed mechanism adapted to rotate the supply and receiver film-reels mounted on the carrier at differential speeds, and a sprocket wheel and sprocket mechanism adapted to alternately advance and position films for exposures.

5. A film-exposure apparatus comprising a frame and mounted thereon transmission mechanism operable by power and, operably connected with said transmission mechanism, a medially-pivoted, oscillating carrier adapted to operably mount a supply film-reel, means to operably mount a receiver film-reel, shift mechanism adapted to shift said carrier, reel-feed mechanism adapted to rotate film-reels mounted as aforesaid, and a sprocket wheel and sprocket mechanism adapted to alternately advance and position films for exposures.

6. A film-exposure apparatus comprising a frame and mounted thereon transmission mechanism operable by power and, operably connected with said transmission mechanism, a medially-pivoted, oscillating carrier adapted to operably mount a supply film-reel, means to operably mount a receiver film-reel, compensating shift mechanism adapted to shift said carrier and maintain substantial tangency between the outer film-spiral of the supply reel thereon and the film-approach plane of the apparatus, differential reel-feed mechanism adapted to rotate film-reels mounted as aforesaid at differential speeds, and a sprocket wheel and sprocket mechanism adapted to alternately advance and position films for exposures.

7. A film-exposure apparatus comprising a frame and mounted thereon transmission mechanism operable by power and, operably connected with said transmission mechanism, a medially-pivoted oscillating carrier adapted to operably mount, supply and receive film-reels to opposite sides of its pivot, shift mechanism adapted to oscillate said carrier, reel-feed mechanism adapted to rotate film-reels mounted on said carrier, and a sprocket wheel and sprocket mechanism adapted to alternately advance and position films for exposures.

8. A film-exposure apparatus comprising a frame and mounted thereon transmission mechanism operable by power and, operably connected with said transmission mechanism, a medially-pivoted oscillating carrier adapted to operably mount supply and receiver film-reels to opposite sides of its pivot, compensating shift mechanism adapted to oscillate said carrier and maintain substantial tangency between the outer film-spiral of the supply-reel thereon and the film-approach plane, differential reel-feed mechanism adapted to rotate the supply and receiver film-reels mounted on the carrier at differential speeds and a sprocket wheel and sprocket mechanism adapted to alternately advance and position films for exposures.

9. In a film-exposure apparatus comprising a frame, a movable carrier adapted to operably mount a supply film-reel, means to operably mount a receiver film-reel, and a sprocket wheel adapted to engage and position films, the combination therewith of shift mechanism adapted to shift said carriage, reel-feed mechanism adapted to rotate film-reels mounted as aforesaid, a transmission shaft operable by power, a variable-speed worm gearing operably connecting said shaft and sprocket, and a worm gearing operably connecting said shaft with said shift mechanism and reel-feed.

10. In film-exposure apparatus, an oscillating carrier adapted to revolubly mount a film-reel holder, a film-reel holder revoluble on said carrier, a shaft revoluble in bearings on said carrier, a friction wheel thereon adapted to rotate said holder and radially shiftable relatively to a reel therein, and means to rock said carrier and rotate said shaft.

11. In film-exposure apparatus, a frame; and mounted thereon a primary shaft operable by power and an intermediate shaft geared thereto; an oscillating carrier pivoted on said intermediate shaft; revolubly mounted on said carrier a film-reel holder, and a feed shaft geared to said intermediate shaft; on said feed shaft a friction wheel coacting with, and radially adjustable relatively to a film-reel in said reel holder; and gearing operably connected with said primary shaft and adapted to oscillate said carrier and shift said friction wheel.

12. In film-exposure apparatus, a frame; and mounted thereon a primary shaft operable by power and an intermediate shaft geared thereto; an oscillating carrier pivoted on said intermediate shaft; revolubly mounted on said carrier a film-reel holder, and a feed shaft geared to said intermediate shaft; on said feed shaft a friction wheel coacting with, and radially adjustable relatively to a film-reel in said reel holder; and gearing operably connecting said intermediate shaft with said carrier and friction wheel and adapted to rock said carrier and shift said wheel.

13. In film-exposure apparatus, a frame; and mounted thereon a primary shaft operable by power and an intermediate shaft geared thereto; an oscillating carrier pivoted on said intermediate shaft; revolubly mounted on said carrier a film-reel holder, and a feed shaft geared to said intermediate shaft; on said feed shaft a friction wheel coacting with, and radially adjustable relatively to a film-reel in said reel holder; and gearing adapted to oscillate said carrier and shift said friction wheel and comprising a wheel segment pivoted on said frame, a gear train connecting said intermediate shaft with said segment, and links connecting said segment with said carrier and friction wheel.

14. In film-exposure apparatus, a frame; and mounted thereon a primary shaft operable by power and an intermediate shaft geared thereto; an oscillating carrier pivoted on said intermediate shaft; revolubly mounted on said carrier a film-reel holder, and a feed shaft geared to said intermediate shaft; on said feed shaft a friction wheel coacting with, and radially adjustable relatively to a film-reel in said reel holder; gearing adapted to oscillate said carrier and shift said friction wheel and comprising a wheel segment pivoted on said frame, a gear train connected with said intermediate shaft and terminating in a pinion meshing with said segment, a clutch connected with said pinion and adapted to engage it with and release it from said train, and links connecting said segment with said carrier and friction wheel.

15. In film-exposure apparatus comprising transmission mechanism operable by power, and film-positioning sprocket apparatus, the combination therewith of a revolubly mounted reel clamp adapted to hold reels and comprising a frictional disk and a clamp plate, a reel-feed mechanism operably connected with said transmission mechanism and terminating in a friction drive wheel adapted to coact with said frictional disk, a spring adapted to close said reel clamp and press its said friction disk against said friction wheel, and an abutment for said spring.

ALEXANDER G. DONNELLY.

Witnesses:
 JOHN MORRIS,
 H. D. PENNEY.